INVENTOR.
Robert Wahli
BY
Pierce, Scheffler & Parker
Attorneys

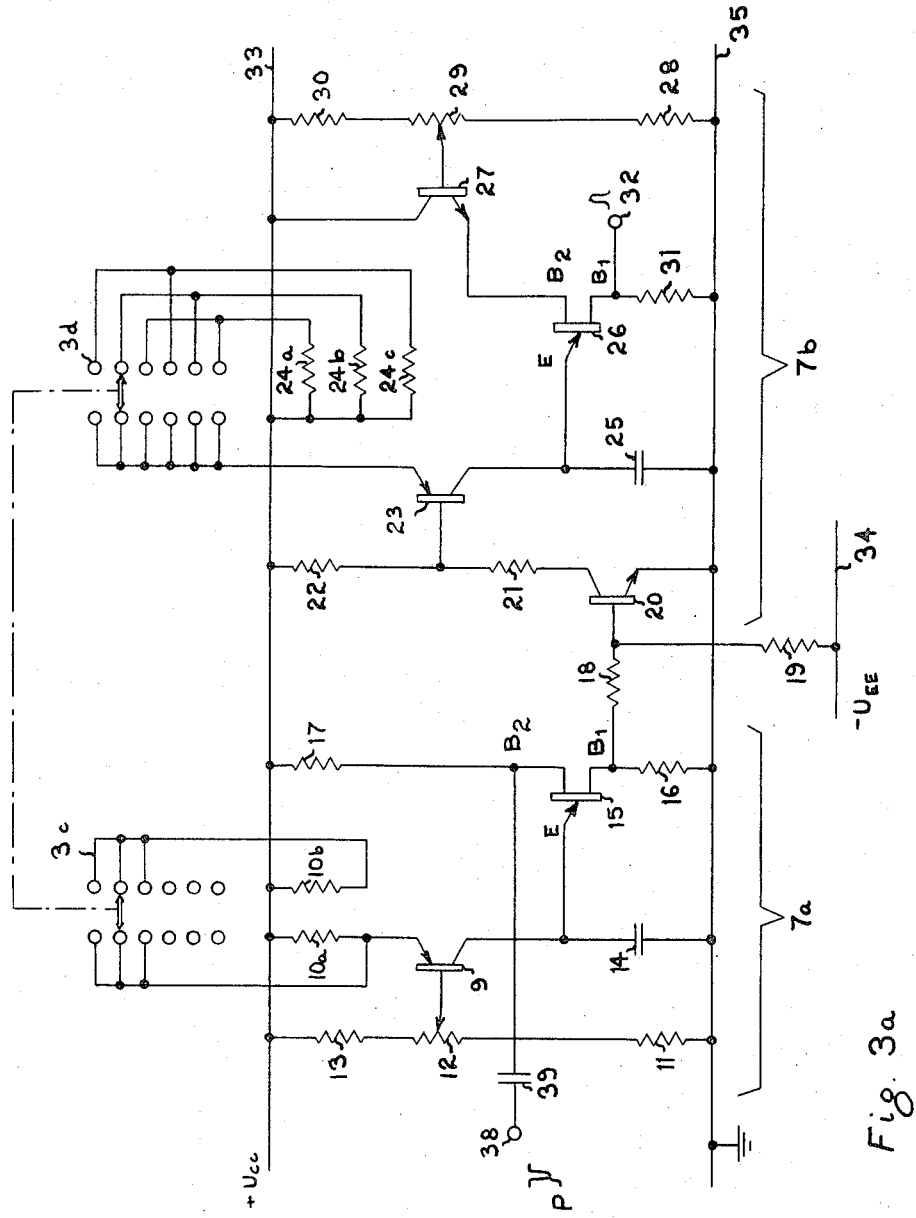

United States Patent Office 3,369,155
Patented Feb. 13, 1968

3,369,155
APPARATUS FOR THE DIGITAL MEASUREMENT OF AN ELECTRIC CHARGE
Robert Wahli, Unterengstringen, Zurich, Switzerland, assignor to Ciba Limited, Basel Switzerland, a company of Switzerland
Filed Mar. 9, 1966, Ser. No. 533,084
Claims priority, application Switzerland, Mar. 24, 1965, 4,118/65; Sept. 3, 1965, 12,352/65
14 Claims. (Cl. 317—27)

This invention relates to apparatus for the digital measurement of an electrical charge fed to a load.

In the analysis of physical or chemical operations the electric charge fed to a load is frequently measured to indicate the quality of said operation. The electric charge is defined as the time integral of the current and is indicated in Coulombs. Measuring instruments for determining a charge, which are often provided with a suitable current supply, are called coulometers. The simplest coulometers are those which work with a single constant current value and reduce the measurement of charge to a simple measurement of time, use being generally made of mechanical or electronic clocks the scales of which are calibrated direct in Coulombs.

In analytical chemistry it is advantageous when determining quantities of substances by electrochemical methods for the charge quantities required to carry out a reaction to be fed to the load not simply by means of a single current value but by currents graduated in respect of time. At the commencement of the analysis the charge quantities fed to the load per unit of time should be as great as possible and towards the end of the measurement they should be only small. For the purpose of measuring the electric charge, the above-mentioned coulometers can be used but each measurement cannot be utilised direct but must in each case be multiplied by a factor dependent on the current value selected. Apart from the fact that the direct determination of the total charge provided over the entire period of measurement is thus impossible, this method of measuring may give rise to errors in reading or conversion.

In order to measure the charge for various current intensities methods and apparatus have been developed which integrate the current over a given period of time. A known measuring device of this type passes part of the measuring current through the field winding of a motor, the rotor of which is coupled to a decade counting mechanism; the speed of rotation of the rotor is in this case proportional to the current value and the number of revolutions is proportional to the electric charge fed to the load. This proportionality between speed of rotation and measuring current is however strictly linear only in a narrow range which is hardly sufficient for practical applications without expensive counteracting measures, moreover this proportionality factor is highly dependent on temperature. Another disadvantage of this device is the inertia of motor and counting mechanism, since further nonlinearity is caused during the starting and braking of the motor. It is true that a reduction of the sources of error is in principle possible, but the measures required for this purpose are expensive. Thus for example, in order to improve linearity between current value and speed of rotation of the motor, measuring resistors are connected in parallel to the field winding and always keep in the same range the working current branched off from the measuring current, and between the rotor and counting mechanism a reduction ratio is provided which reduces the counting speed of the counting mechanism in accordance with the value of the measuring resistors selected. In order to reduce high moments of inertia this reduction ratio is provided for example by means of perforated discs and corresponding photoelectric scanning. Even with such considerable expenditure however the disadvantages caused by the inertia of the motor still persist.

The aim of the invention is to provide improved apparatus which will enable digital measurement of an electric charge fed to a load to be made in such a manner that even when a plurality of different current values are used a direct indication of the total charge fed to a load is possible.

According to the present invention therefore we provide apparatus for the digital measurement of an electric charge fed to a load comprising an undirectional current source adjustable to provide different fixed values of current, an oscillator adjustable to provide signals of different frequencies, means for simultaneously adjusting the current source and the oscillator to provide for each different value of current a different frequency so that the product of each current and the period of its associated frequency remains constant and an indicator for indicating in digital form the number of periods of the signal fed from said generator to said indicator during the time the current source is connected to a load.

In a preferred embodiment of the invention the constant current source is variable in steps and the oscillator which forms in effect a time measuring device consists of a serial connection of an impulse generator of constant frequency, a demultiplier which is variable in steps, and an indicating pulse counter, the adjusting devices for the current value of the constant current supply and for the reduction ratio of the divider being coupled together in such a manner that for each selection stage the product of the adjusted current value and the pulse period is constant at the output of the divider.

The advantage of each apparatus is obvious; since the reductions of current value and counting pulse period are adjusted to one another, each counting pulse always corresponds to the same elementary charge quantity so that conversion of results of measurements is eliminated. Measurement of time can be effected with great accuracy if according to a further feature of the invention a quartz-stabilised oscillating circuit arrangement or a tuning-fork oscillator followed by a pulse forming stage is used as the pulse generator of constant frequency. The pulse generator and also the selected divider stage are continuously in operation and during the period in which the load current is switched on are switched through to the pulse counter, so that starting and braking problems, such as occur when the solution utilising a measuring motor is adopted, are eliminated. The counting pulses are switched through practically without inertia and without retardation.

Adequate accuracy of the result of the measurement is conditional upon the constant current supply and the time measuring device being switched on and off as far as possible simultaneously. According to a further feature of the invention this is achieved through the use of a two-pole relay having two overlapping, flat, ferromagnetic reeds, separated by a small air gap and sealed under gas atmosphere in a glass capsule (Reed type relay) for the synchronous switching on of the load current of the constant current supply and of the counting pulse train of the time measuring device.

In order that the invention may be fully understood, preferred embodiments thereof will now be described with reference to the accompanying drawings in which:

FIGURE 1 shows a general block diagram of a simplified form of apparatus according to the invention;

FIGURE 2 a block diagram of a preferred embodiment of the invention;

FIGURE 3a an example of construction of a divider stage included in the circuit of FIGURE 2;

FIGURES 3b, 3c, 3d show diagrams explaining the operation of the divider illustrated in FIGURE 3a;

Figure 5:
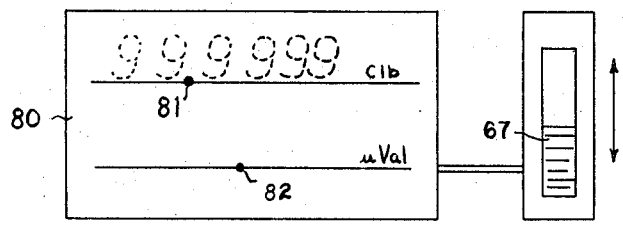

FIGURE 5 a scale change-over device, and

Figure 4:
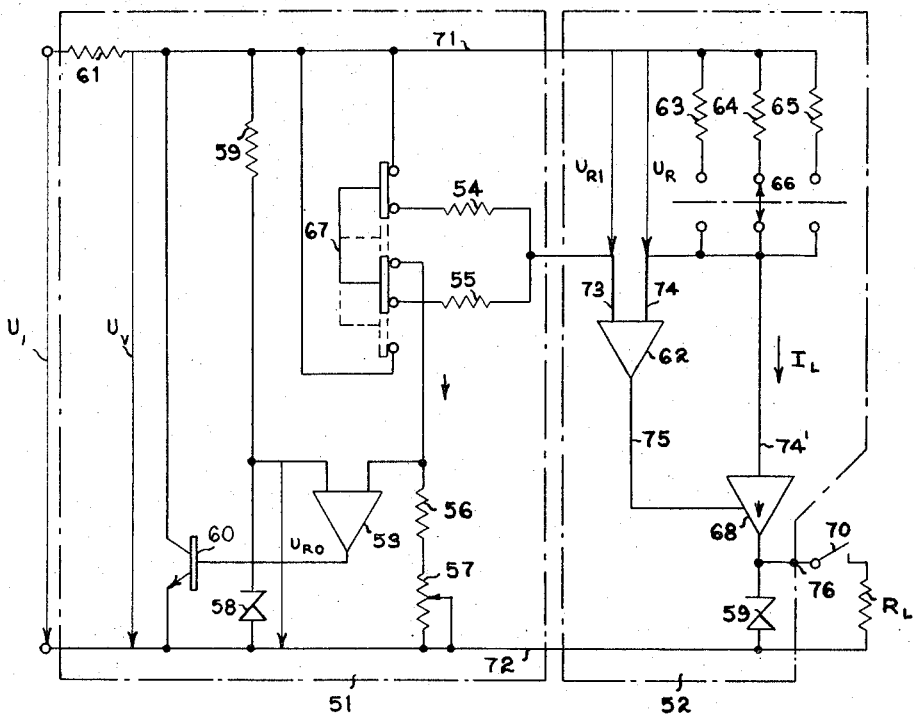
FIGURE 4 shows a circuit diagram of a constant current supply.
Figure 6:
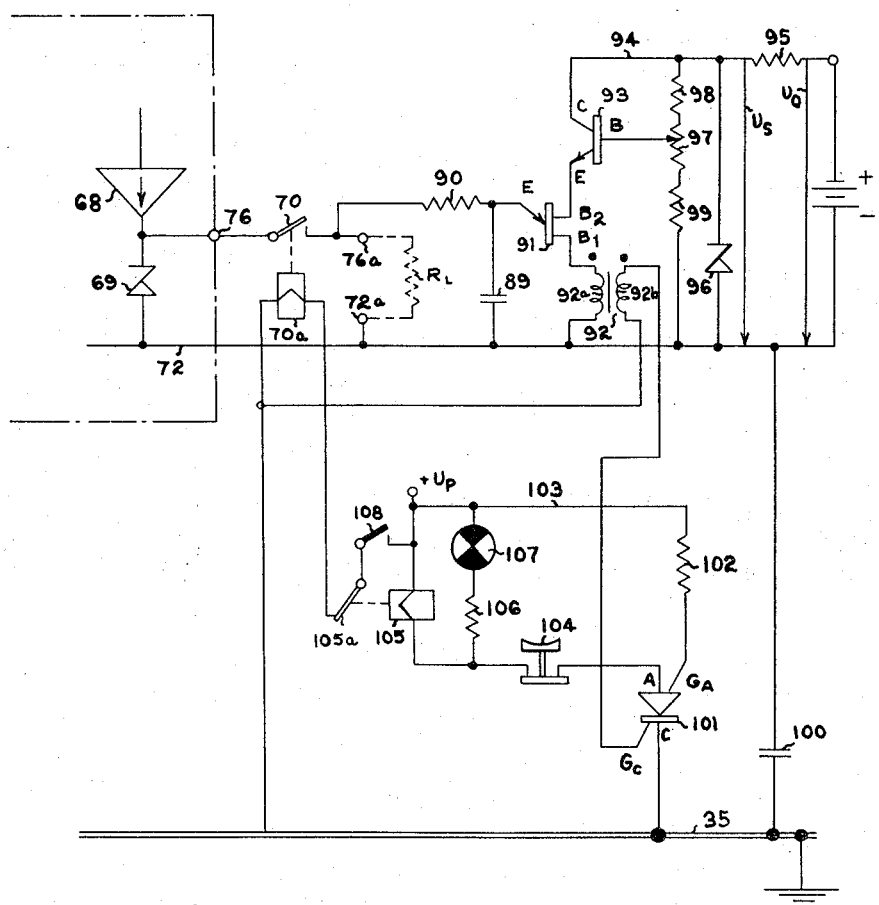

FIGURE 6 a safety circuit arrangement for use with the circuit shown in FIGURE 4.

Figure 1:
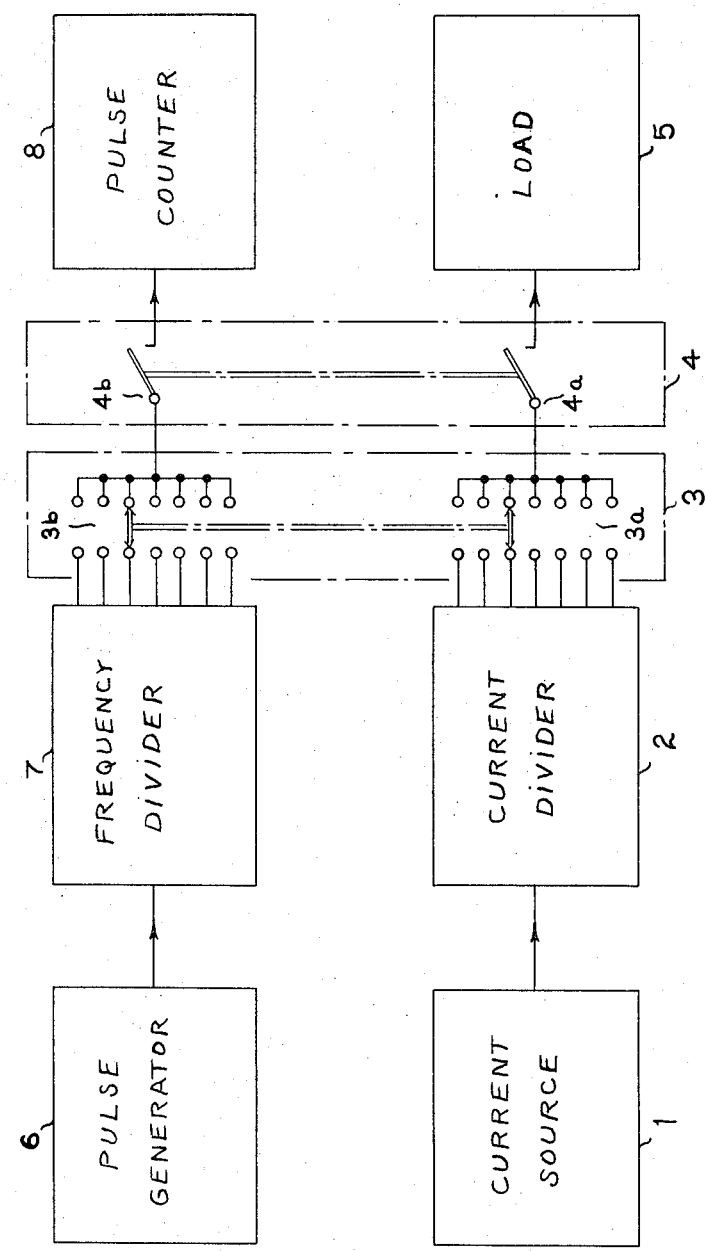

FIGURE 1 shows apparatus for the digital measurement of a charge fed to a load which has been simplified to aid in understanding the principle of said measurement. The apparatus basically comprises two channels, the first comprising a stable pulse generator 6 and a frequency divider 7 whose output is fed via switch contacts 3b and 4b of switches 3 and 4 respectively to a pulse counter 8 and a second channel comprising a current source 1 and a current divider 2 whose output is fed via switch contacts 3a and 4a of the switches 3 and 4 respectively to a load 5. The constant current supply 1 has a high internal resistance in order to keep the load current constant even in the event of considerable fluctuations of the ohmic resistance of the load 5 which may for example comprise an electrolytic bath. The current divider 2 is here shown separately only in order to facilitate understanding of the principles underlying the invention in practice the divider forms part of the constant current supply 1 as will be described with reference to FIGURE 4.

The switch 4 is preferably a two-pole relay having two overlapping, flat, ferro-magnetic reeds, separated by a small air gap and sealed under gas atmosphere in a glass capsule such as the Reed type relay.

Adjustments to the current value $I_n$ provided by the source 1 and of the reduction ratio of the pulse frequency $f_n$ provided by the divider 7 are selected by means of the switch 3 so that the ratio $I_n/f_n$ is constant. This is the case when the maximum current value $I_0$ and also the basic frequency $f_0$ are divided by the same factor $n$: $I_n = I_0/n$; $f_n = f_0/n$. The charge fed to the load 5 during a pulse period $T_n = 1/f_n$ then amounts to:

$$Q_0 = I_n/f_n = I_0/n \cdot n/f_0 = I_0/f_0 = \text{constant}$$

and is independent of the current value $I_n$ selected in each individual case.

Figure 2:
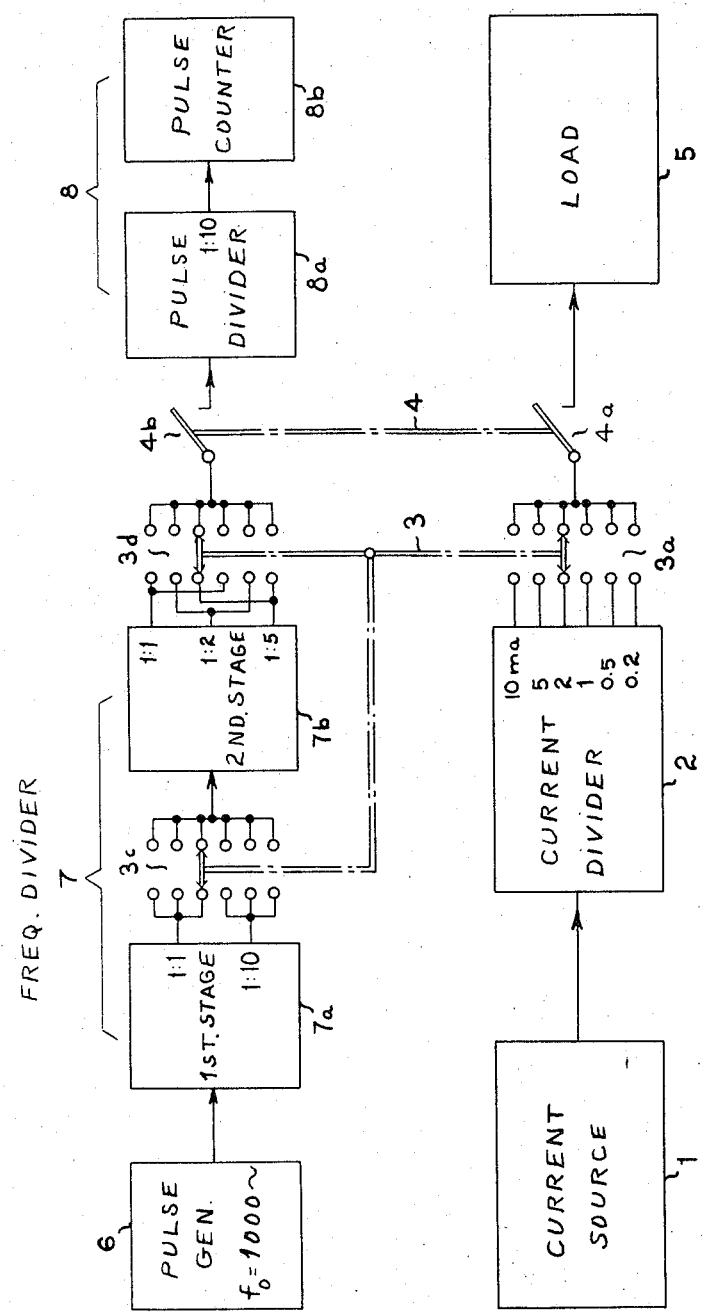

The block diagram of FIGURE 2 showing a preferred embodiment of the invention differs from the block diagram shown in FIGURE 1 principally in the separation of the divider 7 into a first stage 7a and a second stage 7b in cascade connection. The stage 7a has a decade division ratio whilst stage 7b has a division ratio lying in the range between 1 and 9. With the aid of this arrangement a wide range of division ratios is provided. The sequence of the stages 7a and 7b can be interchanged and can moreover be subdivided into similar partial stages.

The currents assumed in FIGURE 2 and which are provided at the outlet of the current divider 2 preferably are: 10 ma., 5 ma., 2 ma., 1 ma., 0.5 ma. and 0.2 ma. ($I_0$=10 ma.). The corresponding reduction ratios are accordingly: $n$=1:1, 1:2, 1:5, 1:10, 1:20 and 1:50. The frequency of the pulse generator 6, $f_0$=1,000 c.p.s., must accordingly be reduced in corresponding ratios, which is here effected by the first demultiplier stage 7a having division ratios of 1:1 and 1:10 and the second stage 7b having division ratios of 1:1, 1:2 and 1:5.

The selector switch 3 in this embodiment comprises three sections, the contacts 3c and 3d being coupled together in such a manner that on multiplication of the adjusted division ratios of stages 7a and 7b the desired total division ratio appears at the contact 4b of the load switch 4. In the position of the selector switch 3 shown in FIGURE 2, each counting pulse reaching the pulse counter 8 corresponds to a charge quantity $$Q = (2 \text{ ma.}) \cdot (1.5/1000 \text{ sec.}) = 10 \text{ } \mu As = 10 \text{ } \mu Clb$$

This charge quantity of 10 $\mu$Clb per counting pulse constitutes about 0.001% of the typical charge quantity usually required for coulometric purposes, which is a high order of accuracy having regard to the accuracy which can be achieved by a constant current supply built at reasonable expense, and the accuracy to which the end of an analysis can be determined by switching off the load switch 4. While retaining a basic operating frequency of $f_0$=1000 c.p.a., the pulse counter 8 can be formed by connecting in cascade a divider 8a having a division ratio of 1:10 and an electromechanical pulse counter 8b. The electronic pulse counter need for counting a frequency of 1000 c.p.a. can thus be replaced by a simpler and less expensive electromechanical pulse counter, the maximum counting frequency of which may be slightly above 100 c.p.s.

On completion of a measurement made at a particular current value that portion of the counter made by the divider 8a which has not been transferred to the counter 8b is stored therein until the commencement of the next measurement at the same or different current value, the divider 8a must therefore be provided with storage properties for example by utilising a plurality of bistable stages. A summation of the errors occurring in individual measurements at different current values is thus avoided, which is a factor of some importance having regard to the fact that for chemical analysis more than 20 measurements are generally necessary.

The basic frequency of the pulse generator 6 has so far been assumed to be $f_0$=1000 c.p.s. It is true that by not providing a divider 8a, a basic frequency of 100 c.p.s. could be used but there woulld be little sense in this because apart from the fact that the errors of the individual measurements would then be added together, a stabilised basic frequency of this value is far more difficult to produce, by means of tuning-fork oscillators for example than a correspondingly high frequency obviously quartz-stabilised oscillator circuit arrangements which are particularly favourable from the point of view of economy, cannot be made to operate at a basic frequency of 100 c.p.s.

The two divider stages 7a and 7b can be formed by known means, such as ring counters, multivibrators, flip-flops and so on. A particularly favourable and inexpensive arrangement is however obtained if the first stage is designed as a synchronised relaxation oscillator while the second is designed as a staircase integrator using so-called double-base diodes or unijunction transistors.

In this latter form the two stages cannot be interchanged as suggested previously as will become apparent when considering the circuit shown in FIGURE 3a.

Figure 3B:
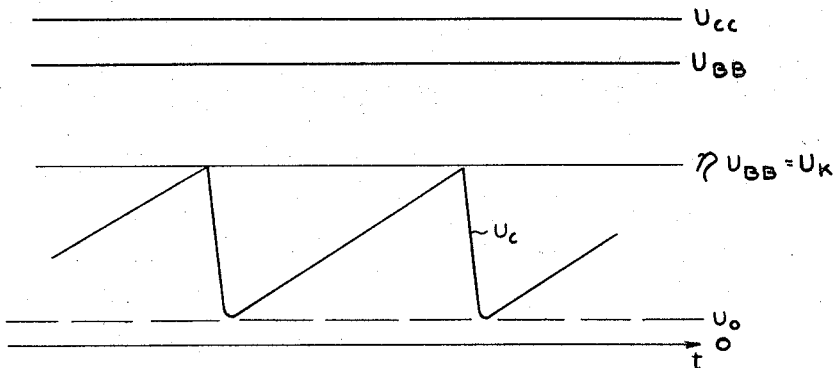

FIGURE 3a shows as an example a divider constructed in accordance with the above considerations; the reference numerals of the synchronised relaxation oscillator 7a and of the staircase integrator 7b correspond to those of the divider stages 7a and 7b illustrated in FIGURE 2. In stage 7a the pulses P supplied by the pulse generator 6 are applied to an input terminal 38 and thence through an isolating capacitor 39 to the base B2 of a double-base diode 15. The base B2 of said diode is connected through a resistor 17 to the positive voltage $U_{cc}$, line 33, while the base B1 is connected through a resistor 16 to the earth line 35. Between the emitter E of the double-base diode 15 and the earth line 35 a charging capacitor 14 is situated which is fed with a constant current through the collector of a transistor 9. The base of this transistor is connected to the variable tap of a potentiometer 12 which forms part of a voltage dividing circuit comprising resistor 11, potentiometer 12, and resistor 13. The emitter of the transistor 9 is connected through a resistor 10a to the positive voltage $U_{cc}$, while by means of the contact 3c of the selector switch 3 another resistor 10b can be connected in parallel to the resistor 10a. The operation of the stage 7a is explained below with the aid of diagrams 3b and 3c. When this stage is switched on by application of voltage $U_{cc}$, both terminals of the capacitor 14 are connected to earth potential, which is thus also true of the emitter E of the double-base diode 15, whereby the latter is held non-conductive. Between the two bases of the double-base diode 15 there is an interbase voltage $U_{bb}$, which is produced in the interbase resistor by the current which flows through the voltage divider comprising resistor 17, interbase resistor of the double-base diode 15, and resistor 16. The transistor 9 now charges the capacitor with a constant current until the voltage applied to the capacitor $U_c = U_K = \eta U_{bb}$, at which voltage the emitter base 1-diode of the double-base diode becomes conductive in the forward direction and discharges the capacitor 14 through the resistor 16 to leave only a small residual voltage $U_o$ (FIGURE 3b). At this voltage $U_o$ the emitter path of the double-base diode is again non-conductive and the voltage $U_c$ starts to be built up again linearly through the capacitor 14. The arrangement described so far is that of a relaxation oscillator, the frequency of which can be adjusted by means of the potentiometer 12 which controls the collector current of transistor 9 and thus the rate at which the capacitor 14 is charged. By switching over the selector switch 3 and thus connecting in parallel with resistor 10a one or more resistors 10b, various relaxation periods may be selected.

Figure 3C:
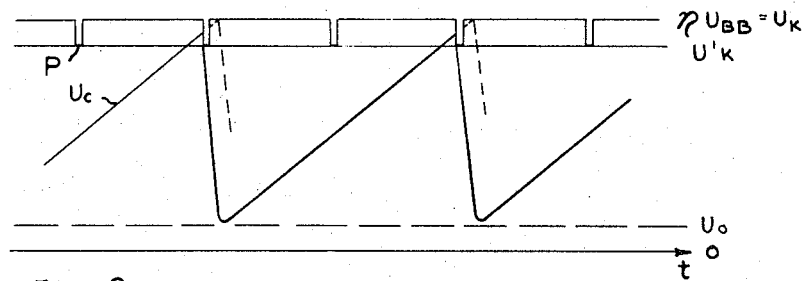

The relaxation oscillator just described is however insufficiently stable in this form as a time base for coulometric measurement purposes, for which reason it must be synchronised with the pulses P produced by the stable pulse generator 6 shown in FIGURES 1 and 2. Through the input 38 the synchronising pulses P of frequency $f_o$ pass directly to the base B2 of the double-base diode 15 and effect a brief reduction of the interbase voltage $U_{bb}$ and hence of the emitter or capacitor change-over voltage $U_K = \eta U_{bb}$ which governs the discharge of the capacitor 14 to the value $U_K'$ (FIGURE 3c). The moment at which the capacitor 14 is discharged through the resistor 16 is thus no longer determined by the natural relaxation period of the oscillator but by a synchronising pulse produced by the pulse generator 6. In the example illustrated in FIGURE 3c a division ratio of 1:2 is selected, for the relaxation oscillator part of the divider circuit which means that every other pulse of the pulse generator effects a discharge of the capacitor 14. Other division ratios may also be provided by operating the selector switch 3, to swtich in parallel with resistor 10a other resistors such as 10b. The sawtooth curve becomes increasingly flatter with increasing division ratios and the switching reliability of the oscillator is reduced. For reasons of stability therefore an upper limit is imposed on the division ratio of the synchronised relaxation oscillator. Since the output pulses from the relaxation oscillator are taken from the resistor 16 have a pulse period dependent on the division ratio of the relaxation oscillator forming the stage 7a, the stage 7b connected in series with stage 7a can no longer be constructed as a relaxation oscillator. Stage 7b is therefore constructed in the form of a rather more expensive so-called staircase integrator.

The input of stage 7b is formed by the transistor 20 the emitter of which is connected direct to earth and the collector of which is connected to the positive feed voltage $U_{cc}$ through the connection in series of the resistors 21 and 22. The base of the transistor 20 is connected to the junction of resistors 18 and 19 which together form a voltage divider, the resistor 18 being connected to the base B1 of the double-base diode 15 and the resistor 19 being connected to the negative feed voltage $-U_{EE}$ of the circuit. The values of the resistors 18 and 19 are chosen so that the emitter diode of the transistor 20 has applied thereto a negative bias in the quiescent state of stage 7b and the transistor is made non-conductive. A second transistor 23 is likewise in a non-conductive state and its emitter is connected through one of the selectable contacts 3d and a corresponding resistor 24a, 24b or 24c to the positive voltage $U_{cc}$. Its base is connected to the junction of resistors 21 and 22 and since in the quiescent state the transistor 20 does not conduct current, the transistor 23 is also non-conductive. The collector of the transistor 23 is connected on the one hand to the emitter E of the double-base diode 26 and on the other hand by way of the capacitor 25 to the earth line 35. The base B1 of the double-base diode 26 forms the output 32 of the stage and is connected through a resistor 31 to the earth line 35. The base B2 of the double-base diode 26 is connected to the emitter circuit of an n-p-n-transistor 27, the collector of which is connected direct to the positive voltage $+U_{cc}$ and the base potential of which can be adjusted by means of a potentiometer 29 forming a part of a voltage divider circuit comprising resistor 28, potentiometer 29, and resistor 30. The positive voltage is conducted through a line 33 and the negative voltage through a line 34.

Figure 3D:
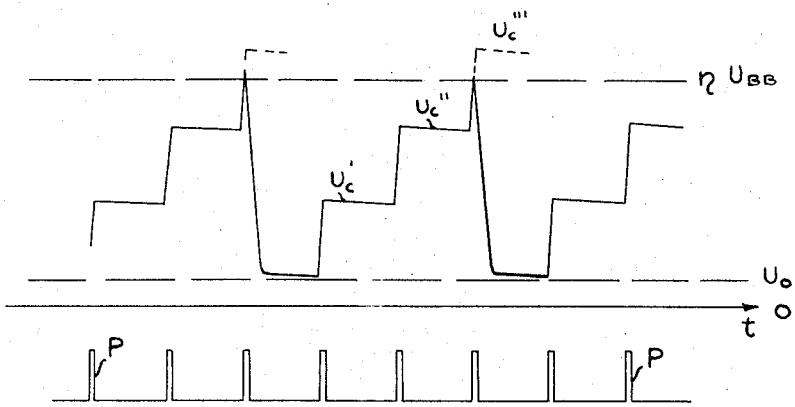

The operation of stage 7b is explained below with the aid of FIGURE 3d. As already mentioned, in the quiescent state, the transistors 20 ad 23 are non-conductive, while the capacitor 25 is discharged to the residual voltage $U_o$ and the double-base diode 26 is non-conductive. On the change-over of the double-base diode 15 from its non-conductive to its conductive state a pulse developed across resistance 16 is applied to the base of transistor 20 which becomes conductive for a short period of time and produces an amplified negative voltage pulse at the base of the transistor 23. The latter also becomes conductive for a short period of time and thereby charges the capacitor 25 to a voltage $U_c'$ (FIGURE 3d). The size of the charge applied to the capacitor depends not only on the conducting time of the transistors 20 and 23 but also on the value of the selected emitter resistor 24a, 24b or 24c for the latter. The voltage $U_c'$ lies below the change-over voltage $\eta U_{bb}$ of the double-base diode 26, so that the latter remains non-conductive. Until the next pulse arrives the voltage $U_c'$ is maintained by the capacitor and is only negligibly reduced by leakage currents of the transistors 23 and 26 and that of the capacitor itself. The next pulse, which charges the capacitor to the voltage $U_c''$, also does not trigger the double-base diode 26. Only the third pulse, which would bring the capacitor voltage to a value $U_c''' > \eta U_{bb}$, causes triggering of the double-base diode 26 and a discharge of the capacitor 25 through the resistor 31 to the residual voltage $U_o$ to produce a pulse at the output 32 of the stage. The connection of the base B2 to the positive voltage $U_{cc}$ through a transistor 27 permits fine adjustment of the magnitude of the switching voltage $\eta U_{bb}$ of the double-base diode 26 by means of the potentiometer 29 and also a considerable temperature stabilisation of the double-base diode. Whereas in the example illustrated in FIGURE 3d a reduction ratio of 1:3 is selected through the corresponding selection of the resistors 24 any other whole number division ratio may also be obtained, such as the ratios 1:1, 1:2 and 1:5 previously referred to.

FIGURE 4 shows in more detail the circuit of a constant current source for providing different values of current. The circuit includes a current divider and constitutes a practical construction of the function blocks 1 and 2 in FIGURES 1 and 2. The circuit also contains a change-over device which permits selective indications of the result of charge measurement in Clb or $\mu$Val units.

The constant current source illustrated in FIGURE 4 is characterised by the combination of a constant voltage source 51 which contains an indication change-over switch 67, and a regulating circuit 52 for providing different values of load current. A constant reference voltage $U_{Ro}$ is applied to one input of a differential amplifier 53, and is produced by means of a Zener diode 58 which in series with a resistor 59 is connected across lines 71 and 72 which carry supply voltage $U_V$. The second input of the differential amplifier 53 is connected to the junction of a voltage divider circuit which consists on the one hand of the series connection of the resistors 54 and 55 and on the other hand of the series connection of the resistor 56 to the potentiometer 57. The output of the differential amplifier 53 controls the base of a transistor 60, the emitter of which is connected directly to the line 72 while its collector is connected directly to the line 71. Between the line 71 and the voltage source $U_1$ (not illustrated) a resistor 61 is connected.

If the voltage $U_V$ is reduced by a value $\Delta U_V$, the voltages at the two inputs of the differential amplifier 53 differ by a value $\delta U_V = a \cdot \Delta U_V$ and $a$ is a constant determined by the voltage divider circuit of the resistors 54, 55, 56 and of the potentiometer 57. At the output of the differential amplifier 53 a correction signal appears which varies the collector current of the transistor 60 until the consequent voltage drop across the resistor 61 is altered to correct for the voltage difference $\Delta U_V$. A movement of the change-over switch 67 into the position shown in broken lines has no effect on the voltage stabilisation just described, since only the sequence of the resistors 54 and 55 in the voltage divider circuit has been transposed; on the other hand at the connection point 73 of the two resistors 54 and 55, which at the same time forms the input of a second differential amplifier 62, a potential appears which is dependent on the position of the change-over switch 67. The resistors 54 and 55 are so selected that their ohmic resistances form a ratio of 1:0.96487, a ratio value which is connected with the change-over of the indication of Clb to $\mu$Val and which will be explained later on. With the aid of the potentiometer 57 the voltage $U_{R1}$ applied through the resistor 54 or 55 can be adjusted to a desired nominal value.

The regulating circuit 52 includes a controllable constant current source 68 which is controlled by means of the output 75 of the differential amplifier 62. The input 74' of the controllable current source 68, which is connected to the second input 74 of the differential amplifier 62, can be connected to the line 71 by a selector switch 66 through one of three resistors 63, 64 or 65; the contacts of the selector switch 66 corresponding to the contacts $3c$ of the selector switch 3 in FIGURES 1 and 2. The values of the resistances are selected so that for each predetermined load current passing therethrough the same voltage drop $U_{R2}$ across the resistance in circuit is produced. This should correspond as far as possible to the voltage drop $U_{R1}$, which appears for a predetermined position of the change-over switch 67 as a voltage drop through the resistor 54 or 55.

The output of the controllable current source 68 is connected to the return line 72 by a Zener diode 69 and externally of the regulating circuit through the output 76, load switch 70 (which is the same as the load switch $4a$ of FIGURES 1 and 2) and the load resistor $R_L$ (function block 5 in FIGURES 1 or 2).

The mode of operation of the regulating circuit is as follows. If the load current $I_L$ flowing through the load $R_L$ with the load switch 70 closed should deviate from the ideal value, the voltage $U_{R2}$ connected to the input 74 of the differential amplifier 62 and produced across one of the three resistors 63, 64 or 65 no longer agrees with the voltage $U_{R1}$ applied to the input 73 of the differential amplifier 62, a correction signal at the output 75 is produced to regulate the current source 68 until the load current agrees again with the required value.

If the reference voltage $U_{R1}$ applied to the input 73 of the differential amplifier 62 is varied by changing over the switch 67, the voltage $U_{R2}$ applied through the resistors 63, 64 or 65 is automatically adjusted to the same value by corresponding variation of the load current $I_L$. In consequence of the selection of the resistors 54 and 55 in the ratio 1:0.96487, the voltage $U_{R1}$ and hence the voltage $U_{R2}$ and the load current $I_L$ vary in the same ratio when the switch 67 is switched over. If the load current were for example 10 ma., after switching over the switch 67 a load current of 9.6487 ma. appears.

Between the units Clb and $\mu$Val there is the relationship 9.6487 Clb $\triangleq$ 100 $\mu$Val; the physical connection between Clb and $\mu$Val is such that for the chemical conversion of 1 Val, that is to say for the conversion of a quantity of substance corresponding to 1 gram-atom/valence, a charge quantity of 96.487 Clb is necessary.

On the switching over the switch 67, the load currents $I_L$ are multiplied by a constant $c = 0.96487$ in accordance with this requirement if the measurement was previously made in Clb, or divided by the same constant $c$ if the indication had previously been made in $\mu$Val, so that the indication of the pulse counter $8b$ (FIGURE 2) agrees with the result of the measurement in the corresponding other unit except for a displacement of the decimal point. On the indication scale of the pulse counter $8b$ therefore only the measurement unit must be changed from Clb to $\mu$Val or vice versa, and the decimal point must be shifted one place.

A simple indication change-over device for use with the pulse counter is illustrated in FIGURE 5. A transparent dial 80 can be brought into one of two discrete positions by means of a change-over switch 67, which need not necessarily be identical with the change-over switch 67 illustrated in FIGURE 4, Clb appearing in the upper case and $\mu$Val appearing in the lower case as the unit of measurement as shown. The indication of the selected unit of measurement is at the same time accompanied by a displacement of the decimal point 81 or 82.

Returning to FIGURE 4, mention must still be made of the Zener diode 69, which when the load switch 70 is open receives current from the controllable current source 68. The Zener voltage of the Zener diode 69 is selected so that the highest possible voltage across the load resistor $R_L$ amounts at most to 80% of the Zener voltage when the load switch 70 is closed so that in the operating state almost the entire current from the controllable current source 68 flows through the load resistor while the current through the Zener diode is smaller by a few orders of magnitude. When the load switch 70 is open on the other hand the voltage across the Zener diode 69 can rise into the Zener range so that the voltage causes full conduction of the diode. This provides the advantage that even when the load is disconnected, the regulating circuit 52 remains in operation so that there is no limitation and the temperature equilibrium is also not changed.

There is however a danger of inaccuracies occurring if in the circuit arrangement illustrated in FIGURE 4, the voltage across the load $R_L$ increases in such a manner that the Zener diode 69 passes out of its regulating range and commences partial conduction. The load current $I_L$ of the controllable current source 68 then flows partly through the load resistor $R_L$ and partly through the Zener diode 69, so that the result given at the pulse counter 8 (FIGURE 1) or $8b$ (FIGURE 2) is inaccurate. Since under normal operating conditions such voltages higher than the regulating voltage of the Zener diode 69 do not occur, excessive voltages must be attributed to defects such as poor contacts, broken wires, and other faults. A protective device may, therefore, be provided which when the voltage through the load resistor $R_L$ rises above a certain limit voltage interrupts the further feeding of the load current $I_L$ through the contact 70 and thus interrupts the pulse counting in the counter 8 or $8b$.

Such a protective device is illustrated in FIGURE 6, which constitutes an extension of FIGURE 4 and in which the current source 68, the Zener diode 69, the load switch 70, the return wire 72, the output terminal 76 and the load resistor $R_L$ are identical with the similarly numbered elements in FIGURE 4. By "load resistor $R_L$" is to be understood in addition to the actual load, also the sum of all supply line and transition resistances and any leakage resistances which occur on the load side of the load switch 70 between the apparatus terminals $72a$ and $76a$.

The load voltage between the terminals $72a$ and $76a$ is also applied to the capacitor 89 which on the one hand is connected to the return line 72 and on the other hand is connected through a resistor 90 to the terminal $76a$.

The emitter E of a double-base diode 91 is connected to the junction between capacitor 89 and the resistor 90, one base $B_1$ of the diode being connected through primary winding 92a of a pulse transformer 92 to the return line 72 while the other base $B_2$ is connected to the emitter E of an n-p-n transistor 93. The transistor 93 is connected as an emitter follower, while the collector C is connected direct to the line 94 and the base B is connected to the variable tap of a potentiometer 97 which forms part of a voltage divider comprising resistor 98, the potentiometer 97, and resistor 99 the voltage divider being connected to the lines 94 and 72. The voltage $U_s$ across lines 94 and 72 is stabilized by a Zener diode 96, while the line 94 is connected to a voltage source $U_Q$ via a resistor 95, the voltage source 75 being preferably identical with the voltage source $U_1$ illustrated in FIGURE 4.

Secondary winding 92b of the pulse transformer 92 is connected on the one hand to the earth line 35 and on the other hand to the control electrode $G_C$ of a controlled rectifier 101. The cathode C of the controlled rectifier 101 is connected direct to the earth line 35 and the second control electrode $G_A$ is connected through a resistor 102 and a line 103 to a positive feed voltage $U_P$. Finally, the anode A of the controlled rectifier 101 is also connected to the positive voltage $U_P$ through a resetting key 104 and the control winding of a relay 105. The series connection of a resistor 106 and indicator lamp 107 is connected in parallel with the control winding of the relay 105.

The control winding of the relay 70a operating the load switch 70 is connected on the one hand to the earth line 35 and on the other hand by way of rest contact 105a of the relay 105 and a switch 108 to the voltage $U_P$. The return line 72 has an alternating current connection to earth through a capacitor 100 connected to the earth line 35.

The mode of operation of the protective device illustrated in FIGURE 6 will be explained below. The contact 70 is closed by operating the switch 108 and thus the load resistor $R_L$ is brought into circuit, whereupon the current path $U_P$, switch 108, rest contact 105a, relay 70a, earth line 35 is closed, and the contact 70 is brought into the closed position. The capacitor 89 is charged through the resistor 90 to the voltage across the load resistor, the response voltage of the emitter E of the double-base diode 91 being so selected that with a normal working voltage across the load resistor $R_L$ and the capacitor 89 the double-base diode 91 will not respond. The adjustment of this response voltage of the double-base diode 91 can be effected by suitable selection of the base-emitter voltage of the transistor 93 with the aid of the potentiometer 97.

If the voltage through the load resistor $R_L$ rises above the response voltage of the double-base diode 91, the capacitor 89 is discharged through primary winding 92a of the pulse transformer 92. Through the secondary winding 92b a positive voltage pulse appears between cathode C and the control electrode $G_C$ in the controlled rectifier 101, whereupon the latter becomes conductive and transmits a current through the control winding of the relay 105. The contact 105a is switched over and thus interrupts the supply of current to the relay 70a, whereupon the contact 70 opens and interrupts the feeding current to the load resistor $R_L$. The anode current of the controlled rectifier 101 flows on the one hand through the relay 105, thus keeping the latter continuously energised, and on the other hand by way of the resistor 106 through the indicator lamp 107, this parallel, induction-free current path serving not only for signalling but also to enable the controlled rectifier to respond quickly, the resistor 106 serving as a current limiter.

The contact 70 now remains open until the cause giving rise to the increased load voltage is eliminated or by operating the resetting key 104 to interrupt the current path of the controlled rectifier 101 and thus the energisation of the relay 105. Erroneous operation of the switch 108 when a fault is indicated has no consequence, because the contact 105a is open and the relay 70a receives no current until the resetting key 104 is operated. It is obvious that the duration of the fault has no influence on the response of the protective device, so that even brief disturbing pulses are detected.

What is claimed is:

1. Apparatus for the digital measurement of an electric charge fed to a load comprising a source of unidirectional current, means for varying in increments the current provided by said source, an oscillator, means for varying in increments the frequency of the signal provided by said oscillator, the first and second means being coupled together so that for each selected increment of current and frequency the product of the selected increment of current and the period of said signal remains constant and a digital indicator for counting the number of periods provided by said oscillator during the time the source is connected to a load.

2. Apparatus for the digital measurement of an electric charge fed to a load comprising a unidirectional current source adjustable to provide different values of current, an oscillator for generating a signal of constant frequency, a frequency divider coupled to said oscillator and having an adjustable division ratio to provide an output signal whose frequency is a sub-multiple of the oscillator frequency, means for simultaneously adjusting said source and said divider to provide for each different value of current a different division ratio so that the product of the current and the period of the divided frequency remains constant and a pulse counter for counting the number of periods in said output signal during the time said source is connected to a load to provide a digital indication of the charge fed to the load from said source.

3. Apparatus according to claim 2 in which said frequency divider includes a first stage having a frequency division ratio which is adjustable and a second stage connected in series with the first stage and having a frequency division ratio which is adjustable.

4. Apparatus according to claim 3 in which said first stage comprises a relaxation oscillator whose period of oscillation is synchronised by the signals from said fixed frequency oscillator and the second stage comprises a staircase integrator circuit.

5. Apparatus according to claim 4 in which said pulse counter includes a pulse rate divider having storage properties and an electro-mechanical counter operable by the signals from said pulse rate divider to provide said digital indication.

6. Apparatus according to claim 5 including a switch for connecting said frequency divider to said pulse counter and said current source to said load.

7. Apparatus according to claim 6 in which said oscillator comprises a quartz crystal stabilized oscillating circuit.

8. Apparatus according to claim 6 in which said oscillator comprises a tuning fork oscillating circuit.

9. Apparatus according to claim 6 in which said switch includes gas protected reed contacts.

10. Apparatus for the digital measurement of an electric charge fed to a load comprising a unidirectional current source adjustable to provide different values of current, an oscillator for generating a signal of constant frequency, a frequency divider coupled to said oscillator and having an adjustable division ratio to provide an output signal whose frequency is a sub-multiple of the oscillator frequency, means for simultaneously adjusting said source and said divider to provide for each different value of current a different division ratio so that the product of the current and the period of the divided frequency remains constant, a pulse counter for counting the number of periods in said output signal during the time the current source is connected to a load to provide a digital indication of the charge fed to the load, a switch for simultaneously connecting the frequency divider to the pulse counter and the current source to the load and a protection circuit for comparing the voltage across said load with an adjustable reference voltage so that upon the former exceeding the latter said switch is caused to disconnect the load from said source.

11. Apparatus according to claim 10 including conversion switching means for modifying the current provided by said source to said load in the ratio 1:0.96487 and multiplying the digital indication by 10 to convert the digital indication from coulombs to Val units.

12. Apparatus for the digital measurement of an electric charge fed to a load comprising a constant voltage source, a unidirection current source connected to said constant voltage source to stabilise said current source, the latter being adjustable to provide different values of current, an oscillator for generating a signal of constant frequency, a frequency divider coupled to said oscillator and comprising a first stage having an adjustable division ratio and including a relaxation oscillator synchronised by the first-mentioned oscillator to provide a signal whose frequency is a sub-multiple of the signal of constant frequency and a second stage having an adjustable division ratio for providing an output signal whose frequency is a sub-multiple of the signal provided by the first stage, means for simultaneously adjusting the source and the division ratios of the first and second stages to provide for each different value of current a different division ratio which is the combination of the division ratios of the first and second stages so that the product of the current and the period of the output signal remains constant, a load, a pulse counter and a switch for simultaneously connecting the output of the second stage to said counter and the source to said load, said pulse counter comprising a pulse rate divider having storage properties and an electro-mechanical counter coupled thereto to provide a digital indication of the charge fed to said load by said source.

13. Apparatus according to claim 12 including a protection circuit for comparing the voltage across said load with an adjustable reference voltage so that upon the former exceeding the latter the switch is caused to disconnect the load from said source.

14. Apparatus for the digital measurement of an electric charge fed to a load comprising a source of unidirectional current, means for varying in increments the current provided by said source, a pulse generator, means for decreasing in increments the repetition rate of the pulse train provided by said pulse generator, the first and second means being coupled together to provide for each different value of current a different repetition rate of pulses from said generator so that the product of the current and the period of the pulses remains constant, a pulse counter for counting the number of pulses from said generator and a switch for simultaneously connecting said generator to said pulse counter and the current source to a load.

References Cited

UNITED STATES PATENTS

| | | | |
|---|---|---|---|
| 2,463,312 | 3/1949 | Rieber | 324—106 |
| 2,550,816 | 5/1951 | Jackson | 324—120 |
| 3,064,193 | 11/1962 | Grubb et al. | 324—120 |

MILTON O. HIRSHFIELD, *Primary Examiner.*

J. D. TRAMMELL, *Assistant Examiner.*